United States Patent
Nikonov et al.

(10) Patent No.: US 7,305,162 B2
(45) Date of Patent: Dec. 4, 2007

(54) REDUCING THE TEMPERATURE SENSITIVITY OF OPTICAL WAVEGUIDE INTERFERENCE FILTERS

(75) Inventors: Dmitri E. Nikonov, San Jose, CA (US); Xianmin Yi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 918 days.

(21) Appl. No.: 10/164,932

(22) Filed: May 30, 2002

(65) Prior Publication Data

US 2003/0223694 A1    Dec. 4, 2003

(51) Int. Cl.
G02B 6/26    (2006.01)
(52) U.S. Cl. .............. 385/39; 385/15; 385/27
(58) Field of Classification Search ............ 385/14, 385/15, 16, 27, 39, 46, 50
See application file for complete search history.

(56) References Cited

U.S. PATENT DOCUMENTS

| | | | | |
|---|---|---|---|---|
| 6,031,948 A * | 2/2000 | Chen | | 385/24 |
| 6,289,147 B1 * | 9/2001 | Bulthuis et al. | | 385/24 |
| 6,304,687 B1 * | 10/2001 | Inoue et al. | | 385/14 |
| 6,377,723 B1 * | 4/2002 | Saito et al. | | 385/15 |
| 6,466,707 B1 * | 10/2002 | Dawes et al. | | 385/14 |
| 6,529,649 B1 * | 3/2003 | Soole | | 385/14 |
| 6,574,409 B1 * | 6/2003 | Moroni et al. | | 385/129 |
| 6,606,433 B2 * | 8/2003 | Oguma et al. | | 385/37 |
| 6,728,446 B2 * | 4/2004 | Doerr | | 385/37 |
| 2001/0033714 A1 | 10/2001 | Delisle et al. | | |
| 2002/0089711 A1 * | 7/2002 | Conzone et al. | | 359/109 |
| 2003/0152304 A1 * | 8/2003 | Gonthier et al. | | 385/1 |
| 2003/0210845 A1 * | 11/2003 | Shani et al. | | 385/14 |

FOREIGN PATENT DOCUMENTS

EP    1087246 A1 *    3/2001
EP    1 089 098    4/2001

OTHER PUBLICATIONS

Y. Inoune et al., *Athermal Silica-Based Arrayed-Waveguide Grating (AWG) Multiplexer*, IOOC-ECOC '97 11th International Conference on Integrated Optics and Optical Fibre Communications/23rd European Conference on Optical Communications, Edinburgh, Sep. 22-25, 1997. Post Deadline Papers, IEE Conference Publication, London, IEEE, vol. 5, No. 448, Sep. 22, 1997, pp. 33-36.

* cited by examiner

*Primary Examiner*—Michael G. Lee
*Assistant Examiner*—April A. Taylor
(74) *Attorney, Agent, or Firm*—Trop, Pruner & Hu, P.C.

(57) ABSTRACT

An interference waveguide device made of a material with a positive derivative of refractive index over temperature may be combined with a compensating waveguide device. The compensating waveguide device may be made of a material with opposite and larger derivative of refractive index. The outputs of the compensating device may be selectively coupled to inputs of the interference device to provide an athermal interference waveguide device.

10 Claims, 1 Drawing Sheet

REDUCING THE TEMPERATURE SENSITIVITY OF OPTICAL WAVEGUIDE INTERFERENCE FILTERS

BACKGROUND

This invention relates generally to optical communication networks, and, particularly, to optical waveguide interference filters.

In present day optical communication networks, interference filters are extensively used for purposes of wavelength channel multiplexing, switching, and dispersion compensation. The most promising type of such filters is based on planar waveguide circuits, fabricated primarily of silica or silicon. One of their major drawbacks is their spectrum temperature dependence caused by the temperature dependence of the index of refraction in the material used to make the circuits. For this reason chips containing such circuits need to be temperature stabilized with a heater or a thermoelectric cooler (TEC). This requires electric power, control electronics for feedback, and management of the dissipated heat.

Therefore, it is advantageous to build temperature insensitive waveguide circuits. There are several approaches to making an athermal device, none of which are completely satisfactory. Some include the mechanical moving of the point where the input fiber contacts the waveguide circuit. This results in severe reliability problems.

Other approaches use a material with a different slope of the refractive index temperature dependence. An example of such a material is a polymer, such as silicone. Grooves are etched through the waveguides and are filled with the polymer. The downside of this method is that the grooves cause high insertion loss due to diffraction. Also, combining two materials in one chip decreases the die yield and reliability and makes the process more complicated and, thus, more expensive.

At the same time, a waveguide made entirely of polymers is being developed. In this case it may be possible to tailor the parameters of the polymer to achieve very small temperature dependence. However, up to now the polymer waveguide devices have failed to compare to silica waveguide devices in performance and reliability.

Thus, there is a need for ways to reduce the temperature sensitivity of optical waveguide interference filters.

DETAILED DESCRIPTION

Figure 1:
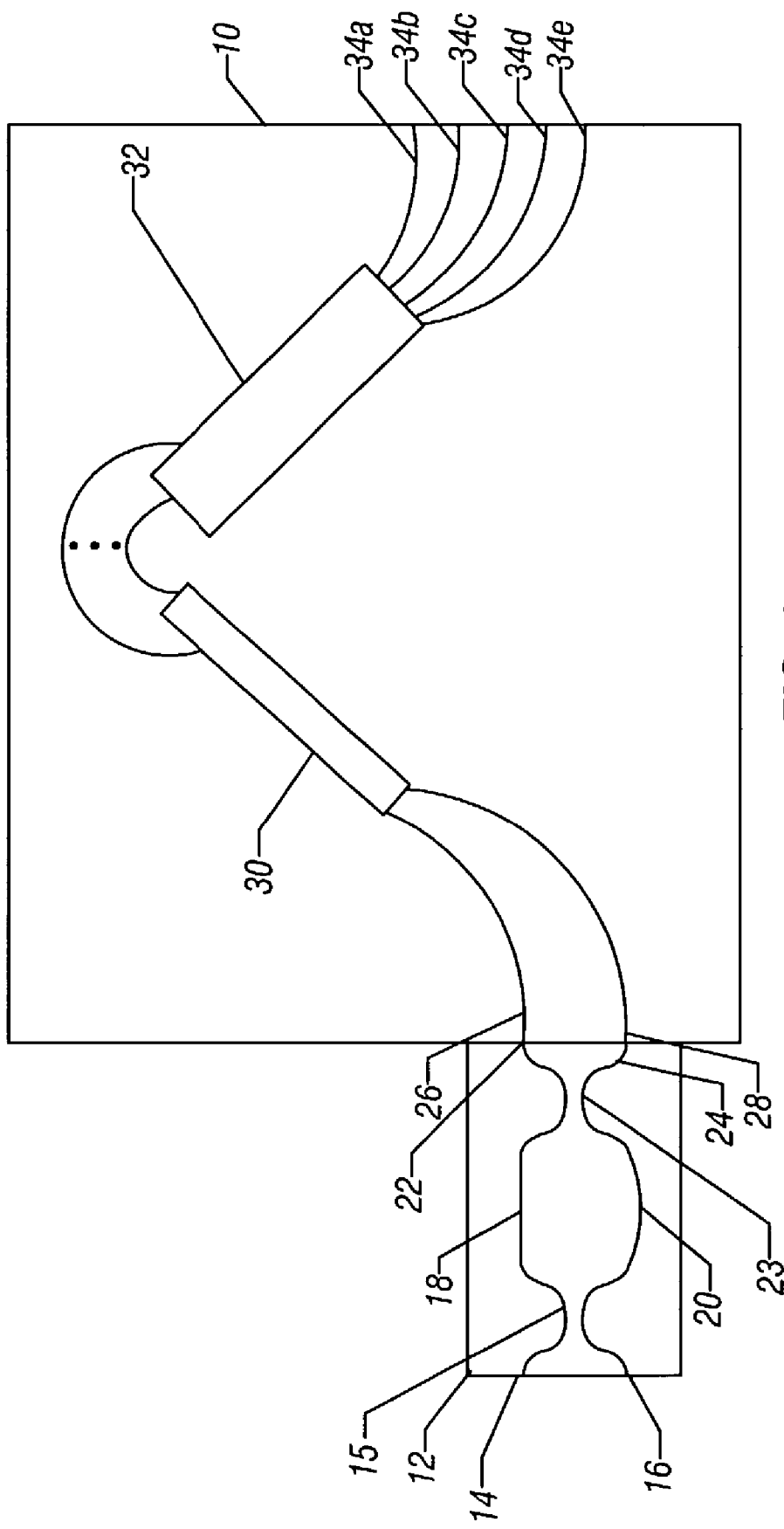
FIG. 1 is a schematic depiction of one embodiment of the present invention.

Two chips 10 and 12, made of heterogeneous materials, may be aligned ("butt-coupled") and packaged together as a single device, as shown in FIG. 1 in one embodiment of the present invention. The compensated chip 10 may be, for example, a traditional silica chip. The compensating chip 12 may be a compensating Mach-Zehnder interferometer (MZI) for example, made of a polymer such as silicone. There is one contact between the chip 10 and the chip 12. If the waveguide sizes in each chip are similar, the losses at the interface between the chips 10, 12 can be made very small (e.g., down to 0.2 dB, which is much less than the losses in the grooves).

The compensating chip 12 may include a Mach-Zehnder interferometer, with a pair of arms 18 and 20. It receives an input from an input port 14 and couples it to the arms 18 and 20 via a 50/50 coupler 15. Another port 16 may also be connected to the coupler 15. A pair of output ports 22 and 24 may be connected to an output coupler 23.

This principle is illustrated with the example of the compensated chip 10 made of silica to act as an arrayed-waveguide grating (AWG). The compensated chip 10 may include input waveguides 26 and 28, couplers 30 and 32, that may be star couplers, and a plurality of output waveguides 34, including, in this example, four output waveguides 34a through 34d.

The compensated chip 10 may be of a material, such as silica, with a positive derivative of refractive index over temperature. The compensating chip 12 may be of a material, such as a polymer, with an opposite and larger derivative of refractive index.

The compensating chip 12 is designed such that as the temperature changes, its output signal is re-directed to different output ports 22 or 24. The output signal from either the output ports 22 or 24, therefore, enters a different input waveguide 26 or 28 of the compensated chip 10.

The optical characteristics of the compensated chip 10 are chosen so that the shift of the input compensates for the temperature change. For example, at the original temperature, the signal arrives in input 26, and the interference device directs a set of wavelengths to output waveguide 34a-d. At the modified temperature, had the signal remained in the input 26, the set of wavelengths would be directed into a set of waveguides 34b-e shifted relative to the original outputs. However, due to the shift from the input 26 to the input 28 at the modified temperature, the set of wavelengths is still directed to the same set of outputs 34a-d. Thus the temperature sensitivity of device 10 is compensated.

Due to a large absolute value of the derivative of the refractive index over temperature in a polymer, for example, the difference of length between the two arms 18, 20 of the MZI in the chip 12, necessary to produce the shift of the output from waveguide 22 to waveguide 24, can be made very small. Therefore, the chip 12 can be made of small size, for example, in embodiments that use a polymer material. This may alleviate yield and reliability concerns in some cases. The performance of the overall device made up of the chips 10 and 12 is determined by the more complicated compensated chip 10. And, most importantly, the relatively small size of the compensating chip 12 may mean large free spectral range, i.e., small wavelength dependence of this compensating action, in some embodiments.

As a simple example, a compensated chip 10 made of silica to act as a Mach-Zehnder interferometer (MZI) may be compensated by a compensating chip 12 in the form of an MZI made of a polymer. The wavelength in vacuum is $\lambda$, the frequency is $\nu$, the speed of light is c. The respective differences of arm length of each interferometer is $\Delta L_i$, and effective modal index is $n_i$ where i indicates the sequence number where multiple back-to-back MZIs are used. The change in the effective modal index is equal to the change of the refractive index of the material used to form the chips 10 or 12 in this example. Then the phase differences in each interferometer are:

$$\phi_1 = \frac{2\pi n_i \Delta L_1}{\lambda} = \frac{2\pi \nu n_1 \Delta L_i}{c}$$

In back-to-back MZIs with exact 50/50 couplers the total phase $\phi=\phi_1+\phi_2$ determines the spectral response. The free spectral range is chosen to be equal to the channel spacing:

$$v_{FSR} = \frac{c}{(n_1 \Delta L_1 + n_2 \Delta L_2)}$$

Neglecting thermal expansion for simplicity, the phase must not change with temperature:

$$\frac{dn_1}{dT}\Delta L_i + \frac{dn_2}{dT}\Delta L_2 = 0$$

Therefore for 100 Ghz, the length difference ($\Delta L$) in a silica MZI implemented by the chip 10 would be 2 mm, but in the compensating chip 12 the length difference is only 54 µm. With a polymer compensating chip MZI, the length difference and the chip itself can be much smaller. If the temperature changes from 0 C to 85 C, the refractive index of silica changes by $\Delta n=8.5 \times 10^{-4}$ and the phase changes by 6.9 rad, i.e., the spectrum shifts by more than a channel separation. With the polymer compensating chip, the index change can be reduced to practically zero, determined by the precision of coupler splitting ratios.

Now, we turn to a more complicated example of an AWG chip as the compensated chip 12. Its parameters are: the index in the slab or star couplers 30, 32 is $n_s$, which changes like the refractive index of the material; the length difference between adjacent arrayed waveguides 26 and 28 is $\Delta L$, the separation between waveguides at the input, output, and junction with the array are $a_i$, $a_o$, and a, respectively; and the radius of the star couplers 30, 32 is R. Then the phase difference corresponding to the path from the input waveguide p to output waveguide q through the arrayed waveguide m (all labeled starting from the center of the star coupler) is:

$$\phi_{pmq} = \frac{2\pi v}{c} m \left( n_2 \Delta L + \frac{n_s p a a_i}{R} + \frac{n_s q a a_o}{R} \right).$$

The peak in the spectrum occurs when $$\phi_{pmq} = 2\pi mM,$$

where M is an integer number, the order of the grating for the specific frequency range. For the compensation to occur, when $\phi_1$ changes by $\pi$, moving from one output of one MZI to another MZI is:

$$\frac{2v\Delta L_i}{c}\frac{dn_1}{dT}\Delta T = 1.$$

M must remain the same, but for the other input p-1, in other words, $$\frac{M}{n_2}\frac{dn_2}{dT}\Delta T + \frac{vn_s a a_i}{R} = 0,$$

which leads to the condition $$\frac{M}{n_2}\frac{dn_2}{dT} + \frac{dn_1}{dT}\frac{2n_s a a_1 \Delta L_1}{R\lambda^2} = 0$$

For typical parameters of an AWG, $\Delta L_i$ between the waveguides 26 and 28 is 130 µm to provide the needed compensation.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
providing a compensated waveguide device having a first index of refraction;
providing a compensating waveguide device with a second index of refraction;
coupling a plurality of outputs of said compensating waveguide device to a plurality of inputs of said compensated waveguide device; and
causing the output of said compensating waveguide device to change from one output to another depending on temperature.

2. The method of claim 1 including routing an output of said compensating waveguide device to a different input of said compensated waveguide device.

3. The method of claim 2 including providing two different waveguides at each input of said compensated waveguide device.

4. The method of claim 3 including providing each of said input waveguides with a different length to compensate for different temperatures.

5. The method of claim 1 including using a Mach-Zehnder interferometer having two outputs as the compensating waveguide device.

6. The method of claim 5 including coupling said Mach-Zehnder interferometer to an arrayed waveguide to provide temperature compensation for said arrayed waveguide.

7. A waveguide comprising:
a Mach-Zehnder interferometer having a first input and a pair of outputs; and
said Mach-Zehnder interferometer to provide an output signal on a selected one of said outputs depending on the ambient temperature.

8. The waveguide of claim 7 wherein said Mach-Zehnder interferometer is coupled to an arrayed waveguide to provide temperature compensation for said arrayed waveguide.

9. The waveguide of claim 8 wherein said Mach-Zehnder interferometer and said arrayed waveguide have different indices of refraction.

10. The waveguide of claim 9 wherein said arrayed waveguide includes two different waveguides at two different inputs to said arrayed waveguide.

* * * * *

UNITED STATES PATENT AND TRADEMARK OFFICE
CERTIFICATE OF CORRECTION

PATENT NO. : 7,305,162 B2 Page 1 of 1
APPLICATION NO. : 10/164932
DATED : December 4, 2007
INVENTOR(S) : Dmitri E. Nikonov and Xianmin Yi It is certified that error appears in the above-identified patent and that said Letters Patent is hereby corrected as shown below:

Column 4:
Line 53, after "interferometer" insert --is--.

Signed and Sealed this

Fifteenth Day of April, 2008

JON W. DUDAS
*Director of the United States Patent and Trademark Office*